Aug. 29, 1933.   P. E. CHAPMAN ET AL   1,924,913
GROWLER TYPE TESTING DEVICE
Filed Nov. 9, 1931

Inventor
Penrose E. Chapman
Chas L. Chittenden

Patented Aug. 29, 1933

1,924,913

UNITED STATES PATENT OFFICE 1,924,913

GROWLER TYPE TESTING DEVICE

Penrose E. Chapman, St. Louis, Mo., and Charles L. Chittenden, New York, N. Y.; said Chittenden assignor to said Chapman Application November 9, 1931. Serial No. 573,998

10 Claims. (Cl. 175—183)

The object of our invention is primarily to improve the type of testing devices commonly called growlers and secondarily to improve them to such an extent that a small one can be made sufficiently powerful to be used on the interior of stators, or internal armatures, as well as on external armatures.

Figure 1:
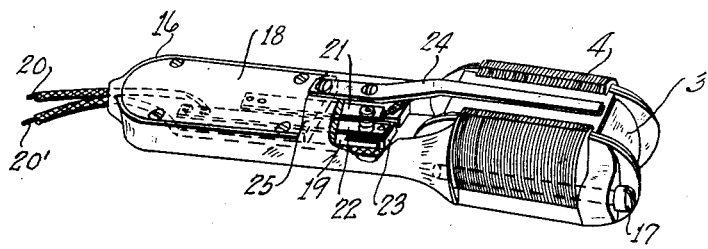

In the drawing Figure 1 is a perspective of our invention.

Figure 2:
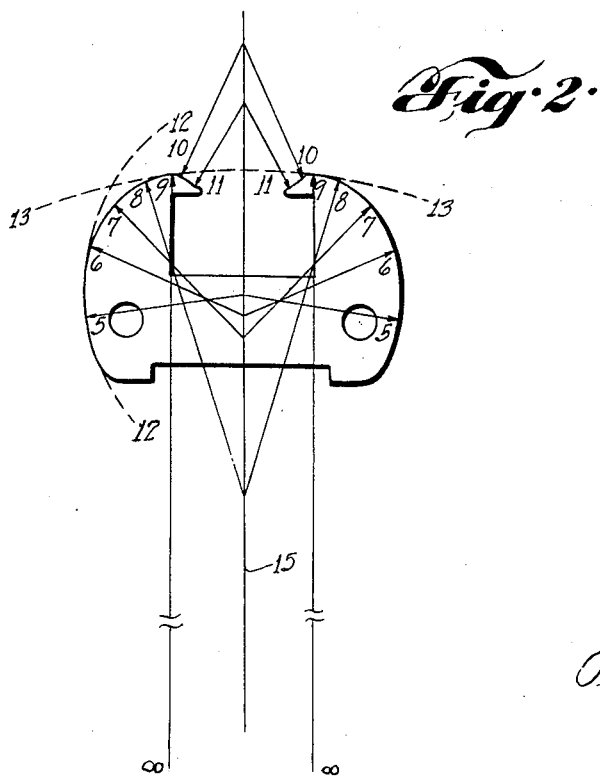

Figure 2 is a detail showing the development of the shape of the pole face.

For brevity the term "growler" will herein be taken to include a device having a primary exciting coil, proportioned to be fed with alternating current after the manner of the primary of a transformer, around a laminated open magnetic core so proportioned that the open portion of said core may be wholly or partially closed by the magnetic portions of the work to be tested. Windings on said work then will act as the secondary of said transformer. Many types of work may be tested by means of growlers and either of the terms armature or stator will be taken to include all such types of work.

It is possible that the most difficult application of a growler is for testing many sizes of stators. We shall therefore describe our invention more particularly in connection with a growler designed primarily for this purpose and secondarily to test external armatures.

In the drawing 3 is the exciting coil; 4 is the laminated core.

The capacity and the properties of a growler are tremendously affected by the air gap between its poles and the work; the shorter it averages the better.

The ideal shape for the pole faces of growlers is a perfect fit to the work to be tested, but owing to varying sizes of work this is seldom possible and it has therefore been customary to form said pole faces straight or cylindrical based on a definite radius. The former gives a uniformly bad power factor on account of the magnetism that must jump, and the length of, the air gap between the pole face and the work. A cylindrical face may give a good magnetic circuit on one size of work and a much worse one than the straight face on other sizes.

We have discovered that a pole face shape that may be said to be a compound of many different or continually varying radii can be made to give a shorter average air gap on varying sizes of work than either straight or cylindrical faces, and that many forms of curves may be used in whole or in part to accomplish this object, as logarithmic, sine, parabolic, asymtotic and the like. For brevity all are included in the term curve of varying radii.

We prefer to disregard conventional curve formulæ and to form the curve of the pole face as diagrammatically illustrated in Figure 2 wherein 5, 6, 7, 8, 9, 10 and 11 are radii of different length roughly showing the construction of the curve or shape of the pole face. It will be noted that these radii start with the short radius, as 5, and progressively increase in length until they may be said to reach infinity at 9, and then reverse and become shorter as 10 and 11. The dotted line 12 may be assumed to be the bore of a small stator showing how closely it approximates the shape of the pole face and that the air gap 14 between the said core 4 and the said stator 12 averages short and of considerable area.

The dotted line 13 may be assumed to be the bore of the larger stator demonstrating the similar characteristics of the air gap.

The centers of radii 5 to 11 except when around infinity in length may fall on the center line 15. The radii will preferably vary continually in length instead of step by step as shown in the diagram and therefore the pole face would carry a smooth flowing curve.

In order to still further improve the growler, we provide a handle 16, preferably in the form of a U the ends of which are joined to the core 4 by the through screws 17.

We close the side openings in the U by two pieces of insulating material 18, 19 that are secured to said handle 16.

It is very desirable that a push switch be conveniently placed in the circuit of the exciting coil so that it can be readily controlled. We prefer to construct such a switch in the handle 16 as by mounting blades 21, 22 upon the insulating portions 18, 19 of the handle 16. An insulating button 23 may be mounted upon blade 22 for its actuation.

We therefore connect one of the circuit wires 20 to a blade as 22 of said switch, one of the terminals of the exciting coil 3 to the other blade 21 as shown in the cutaway of the handle Fig. 1, the other end of said coil being connected to the other line wire 20'.

In connection with a growler one of the best methods of detecting a short circuited coil is to place a small strip of magnetic material commonly called a "feeler" over the opening of the slot containing the coil while the growler is forcing magnetism through said coil. If said coil is short circuited it will set up a magnetic field across said slot opening that will strongly attract said feeler.

We find it a great convenience to mount such a feeler 24 upon a bridge 25 across the legs of the U handle 16. When the feeler 24 bridges a slot containing a short circuited coil the said magnetic field will cause it to vibrate, producing a distinct rattle that is discernible over the normal humming noise that gives a growler its name. Said vibration can be readily felt when the currents in the coils are too small to cause the feeler to audibly rattle, as when the coil may be acting through considerable impedance.

Having now described our invention, we wish to claim:

1. In a growler, the combination of an exciting coil around a laminated open magnetic core, the pole faces of which conform to a curve having varying radii.

2. In a growler, the combination of an exciting coil around a laminated open magnetic core the pole faces of which conform to a curve having varying radii, said radii changing from a minimum to infinity.

3. In a growler, the combination of an exciting coil around a laminated open magnetic core the pole faces of which conform to a curve having varying radii, said radii changing from a minimum to infinity and then becoming shorter.

4. In a growler, the combination of an exciting coil around a laminated open magnetic core having pole faces of varying radii, and a U shaped handle attached to said core.

5. In a growler, the combination of an exciting coil around a laminated open magnetic core having pole faces of varying radii, a U shaped handle attached to said core, and insulating elements carried by said handle.

6. In a growler, the combination of an exciting coil around a laminated open magnetic core having pole faces of varying radii, a U shaped handle attached to said core, insulating elements carried by said handle, and a switch mounted upon said insulating elements.

7. In a growler, the combination of an exciting coil around a laminated open magnetic core having pole faces of varying radii, a U shaped handle attached to said core, said handle having a bridge across its arms which supports a magnetic feeler between the poles of said core.

8. In a growler, the combination of an exciting coil around a laminated open magnetic core having pole faces of varying radii, a U shaped handle attached to said core, said handle having a bridge across its arms which supports a magnetic feeler between the poles of said core, and a switch carried by said handle.

9. In a growler, the combination of an exciting coil around a laminated open magnetic circuit core, with a magnetic feeler rigidly supported between the poles of said core.

10. In a growler, the combination of an exciting coil around a laminated open magnetic core, with a magnetic feeler rigidly supported between the poles of said core by a supporting element secured to said core.

PENROSE E. CHAPMAN.
CHARLES L. CHITTENDEN.